United States Patent

[11] 3,592,517

| [72] | Inventor | Dwight E. Harris<br>Woodstock, N.Y. |
|---|---|---|
| [21] | Appl. No. | 814,253 |
| [22] | Filed | Apr. 8, 1969 |
| [45] | Patented | July 13, 1971 |
| [73] | Assignee | Rotron Incorporated<br>Woodstock, N.Y. |

[54] BEARING MOUNTING ARRANGEMENT
5 Claims, 2 Drawing Figs.

| [52] | U.S. Cl. | 308/26 |
|---|---|---|
| [51] | Int. Cl. | F16c 27/00 |
| [50] | Field of Search | 310/90; 308/26 |

[56] References Cited
UNITED STATES PATENTS

| 3,073,654 | 1/1963 | Richey | 308/26 |
|---|---|---|---|
| 3,122,399 | 2/1964 | Hunter | 308/26 |
| 3,335,942 | 8/1967 | Seigart | 310/90 |
| 3,387,153 | 6/1968 | Grad | 310/90 |

*Primary Examiner*—Milton Kaufman
*Assistant Examiner*—Wesley S. Ratliff, Jr.
*Attorney*—Brumbaugh, Graves, Donohue and Raymond ABSTRACT: A mounting arrangement for a sintered sleeve bearing is described, in an electric motor environment. A bore in the motor structure is of slightly larger diameter than the outside diameter of the bearing and the latter is held against rotation in the bore by a snug-fitting resilient O-ring at each end. The sleeve is secured against axial movement in the bore by a corrugated retaining spring that engages aligned annular grooves in the bore and around the sleeve.

PATENTED JUL 13 1971

3,592,517

INVENTOR
DWIGHT E. HARRIS
BY
Brumbaugh, Graves, Donohue & Raymond
his ATTORNEYS 3,592,517

BEARING MOUNTING ARRANGEMENT

BACKGROUND OF THE INVENTION

This invention relates to bearings and more particularly to an improved sleeve bearing mounting arrangement particularly suited for use in small electric motors.

Sleeve bearings formed of sintered metal, such as bronze, have been found attractive for use in small electric motors because of their ease of fabrication, self-lubricating properties and low cost. As described in U.S. Pat. No. 3,387,153, granted June 4, 1968, to P. P. Grad and assigned to the present assignee, advantage may be taken of the porosity of the sintered material to establish lubricant circulation paths in the bearing, making it not only extremely long lived, but permanently lubricated as well.

The motor bearing described in the above-mentioned patent, besides having a significantly improved lubrication system, effectively overcomes two of the shortcomings of sintered bronze bearings. Since such material is relatively fragile, bearings formed of it are particularly susceptible to rapid deterioration under high temperatures or localized stresses due to misalignment of the shaft. The device of the foregoing patent employs a pair of O-rings to secure the bearing sleeve in the supporting motor structure such that the sleeve is actually spaced from the motor iron and out of contact therewith, yet snugly fastened to it so that there is no relative rotation therebetween. The resiliency of the O-rings allows for a certain degree of misalignment between the shaft and the bearing sleeve, thereby minimizing high localized stresses and extending the effective bearing life. At the same time, the gap between the bearing sleeve and the motor iron reduces heat transfer from the motor to the bearing material, also extending the bearing life.

The foregoing improvements have combined with the relative low cost of the sintered bearing material itself to greatly extend the range of applications of such bearings. However, in many instances, they are not employed because of the problems attendant to retention of the sleeve in its supporting member against the axial or thrust forces generated during operation of the device. This requirement often poses fabrication difficulties that are insurmountable or so adds to the cost that other forms of bearings, e.g., ball, roller, etc., become competitive in cost.

SUMMARY OF THE INVENTION

The present invention employs the resiliently mounted sleeve bearing principle of the foregoing patent in combination with a spring clip retaining element which together provide simple, reliable and inexpensive means to retain the bearing sleeve in its support. Specifically, the bearing sleeve is retained against rotation relative to the motor structure by means of O-rings of the type disclosed in the noted patent and secured against axial movement relative to the motor structure by means of a resilient spring clip, corrugated in form, which engages aligned annular grooves in the outer surface of the bearing and the inner bore of the motor structure respectively. When inserting the bearing sleeve into the bore in the motor, the corrugations in the spring clip are partially flattened in the groove about the periphery of the bearing sleeve to allow it to slide into the bore. When the grooves in the bearing sleeve and the motor bore are aligned, the retaining clip springs outwardly into the groove in the motor bore, so that the respective peaks and valleys of the corrugations engage the aligned grooves in the motor and sleeve structure. The sleeve is thereby firmly locked against axial movement into or out of the motor bore, with the degree of axial freedom determined solely by the clearance between the spring clip and the sides of the respective grooves.

The combination of the resiliently supported bearing sleeve and the spring clip axial retainer provides a sintered bearing construction that is long wearing and effective, while at the same time simple and inexpensive in construction.

BRIEF DESCRIPTION OF THE DRAWINGS

The foregoing features of the invention will become more readily apparent from the following detailed description thereof, when taken in conjunction with the accompanying drawings, in which.

DETAILED DESCRIPTION OF THE INVENTION

Figure 1:
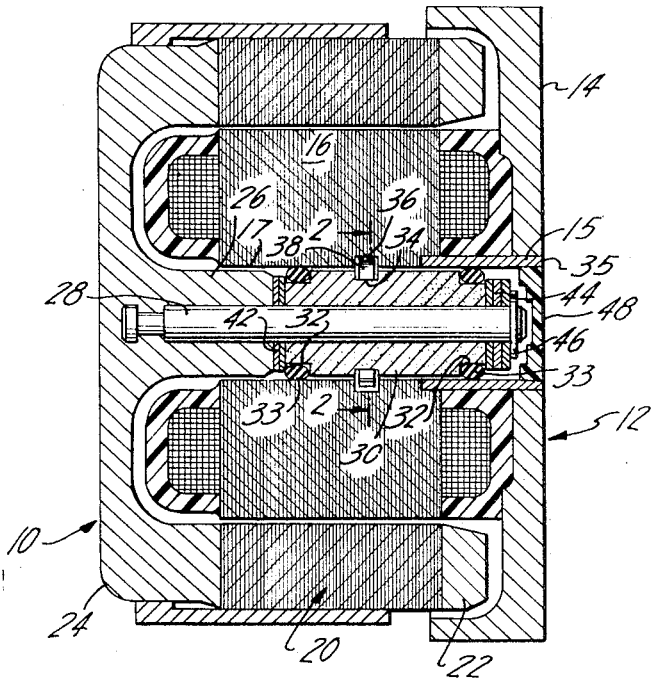
FIG. 1 is a cross-sectional view through an electric motor showing the bearing construction.

An electric motor employing the bearing mounting arrangement of the present invention is shown in cross section in FIG. 1. The motor illustrated is of the so-called inverted type, that is, having the field responsive portion of the rotor 10 outside of the field producing stator structure 12. It will be understood however, that the bearing arrangement of the invention is suitable for use in other motor configurations.

The stator 12 includes a substantially flat end plate 14 on one side of which are mounted the stator laminations and windings, indicated generally at 16. In motors of this type, the stator construction conventionally includes a plurality of annular laminations of steel, known as the "stator iron" and one or more AC-excited electrical coils associated with the stator iron to establish the varying magnetic field. As seen in FIG. 1, the stator iron and the coils are mounted concentrically with and on one side of the end plate 14; the coils being preferably encapsulated in a suitable plastic insulating compound. The stator structure 16 may be cemented or otherwise rigidly fastened to the end plate 14 so that its central bore 17 is concentric with the central opening 15 in the end plate.

The rotor structure 10 comprises the usual laminated structure 20 provided with lengthwise conductor slots (not shown) in which are laid the conductors for interacting with the rotating magnetic field set up by the stator structure 16. In the construction illustrated, the conductor bars in the rotor 20 are cast of a conductive metal, such as aluminum, integrally with the end ring 22 and a hub portion 24. The latter is formed with a concentric, axially extending boss 26 which supports a motor shaft 28 concentrically therewith.

The bearing arrangement comprises a bearing sleeve 30 composed preferably of a sintered metallic material such as bronze, the pores of which are capable of retaining a permanent supply of lubricant. The outer diameter of the sleeve 30 is made smaller than the diameter of the bore 17 in the stator structure 16 to provide radial clearance therebetween. The axial bore in the sleeve is sized to accommodate the shaft 28 in bearing relationship. Each end of the bearing sleeve 30 is stepped to provide an annular shoulder 32 thereat and intermediate the ends of the sleeve there is formed an annular peripheral groove 34. The shoulders and groove are dimensioned to accommodate the O-rings and retaining clip respectively, to be described hereinafter. An annular groove 36 is formed in the wall of the bore 17 which, when aligned with the groove 34 in the sleeve, provides an annular chamber for receiving the retaining clip.

The bearing sleeve is retained within the stator structure by a combination of the resilient O-rings 33 and the retaining clip 38. As indicated in the drawings, the O-rings 33 are selected to be of a diameter such that when in place on the shoulders 32 of the bearing sleeve upon insertion in the stator bore, they engage both the bearing sleeve and the stator with sufficient frictional force to secure the sleeve against rotation relative to the stator. To extend the effective length of the bore, a sleeve 35, preferably of metal and having an internal diameter the same as that of the stator bore, is tightly retained within the stator structure adjacent the coil ends secured to the end plate 14. The right-hand O-ring 33 thus is retained between the bearing sleeve and the extension 35.

Figure 2:
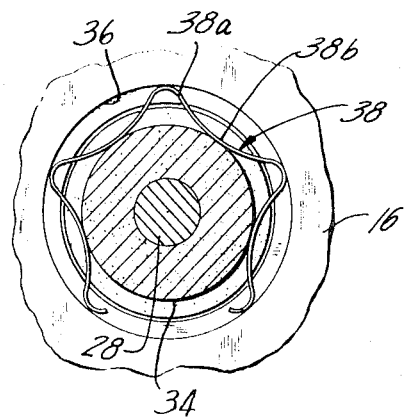
FIG. 2 is a view taken along the lines 2-2 of FIG. 1 showing the position of the axial spring retainer clip in installed position.

To secure the bearing sleeve against axial movement with respect to the stator structure, the corrugated spring clip 38 is provided. As seen in FIG. 2, the clip 38 is in the form of a thin, flat strip of spring material, such as steel, which is corrugated and rolled to provide peaks and valleys 38a and 38b, respectively, such that when wrapped around the bearing sleeve and disposed within the aligned grooves 34, 36, the peaks engage the walls of the groove 36 and the valleys the walls of the groove 34. As will be seen, with the clip thus disposed, relative axial motion between the bearing sleeve 30 and the stator structure 16 is limited to the clearance between the width of the spring clip and the width of the annular grooves. This can be readily held to several thousandths of an inch.

The spring clip is formed such that in its free state, it is somewhat greater in maximum radial dimension than the aligned grooves in which it is to be seated. When assembling the bearing sleeve in the stator, the clip 38 is seated in the groove 34 in the sleeve and the latter is then inserted through a funnel device into the bore 17. The funnel acts to compress the slip within the groove 34 in the sleeve and it is there retained until the bearing sleeve is inserted sufficiently to align the groove 34 with the groove 36 in the stator structure. The clip then has freedom to expand to the extent permitted by the groove 36 and lock the sleeve and stator together. Preferably, when inserted in the aligned groove, the retaining clip is maintained under some radial compression so as to assist in centering the sleeve within the stator bore.

To assemble the stator and rotor components of the motor, thrust washers 42 are slipped over the shaft 28 against the boss 26, the shaft is then inserted in the axial bore of the bearing sleeve and the required number of thrust washers 44 slipped over the protruding end of the shaft to provide thrust bearing surfaces thereat. Finally, the retaining ring 46 is snapped in place in a suitably provided groove in the shaft to retain the assembly. It will be understood that the number and thickness of the thrust washers 42 and 44 are chosen to accommodate the shaft and bearing sleeve dimensions such that the desired degree of axial play is maintained.

Finally, the central opening in the sleeve 35 is sealed with a plastic plug 48 which keeps dirt and dust out of the bearing structure and retains the lubricant within it.

It will be seen then, that the combination of the O-rings 33 and the retaining clip 38 firmly secures the bearing sleeve 30 within the stator bore 17 against both rotational and axial movement. At the same time, however, the relative dimension of the respective elements provide a degree of resiliency which is effective to absorb vibration and compensate for a certain amount of misalignment of the shaft and bearing. The radial gap between the bore 17 and sleeve 30 also serves to lessen temperature rise in the sleeve and adds to its effective life.

It will be understood that the principles of the present invention are applicable as well to motors of construction other than that illustrated. For example, motors of the type wherein the bearing sleeve rotates about a stationary shaft are in common use and the bearing arrangement described hereinabove is equally applicable to such construction. In either form, the retaining clip 38 retains the sleeve against axial movement in the supporting member while the resilient O-rings maintain the sleeve spaced from the motor structure to minimize heat transmission therebetween and also provide a degree of resiliency that reduces vibration and compensates for misalignment. It will be also appreciated that the bearing construction of the invention is not limited for use in electric motors.

I claim:

1. A bearing assembly adapted for mounting in a bore in a support structure comprising, a bearing sleeve having an outer diameter smaller than the diameter of said bore and a central bore adapted to receive a shaft, said sleeve further including an annular shoulder about its outer circumference at each end thereof and an annular peripheral groove intermediate said ends, a pair of O-rings of elastomeric material adapted to be snugly received between said respective shoulders and the bore in said support structure to secure said sleeve against rotation in said bore and provide resiliency therebetween, and a corrugated spring clip adapted to be received in said annular groove and engage both said groove and an aligned groove in the wall of said bore, thereby to restrain said sleeve from axial movement in said bore.

2. The bearing assembly of claim 1 wherein said bearing sleeve is formed of a sintered metal material.

3. A bearing arrangement for an electric motor having rotor and stator elements, one of said elements having a bore for receiving said bearing arrangement, comprising, a sintered metal bearing sleeve having an outer diameter smaller than the diameter of the bore in said one element and a central bore for receiving a shaft supported from the other of said elements, said sleeve further including an annular shoulder about its outer circumference at each end thereof and an annular peripheral groove intermediate said ends, a pair of O-rings of elastomeric material adapted to be snugly received between said respective shoulders and the bore in said element to secure said sleeve against rotation in said bore and provide resiliency therebetween, and a corrugated spring clip adapted to be received in said annular groove and engage both said groove and an aligned groove in the wall of said bore, thereby to restrain said sleeve from axial movement in said bore.

4. The bearing arrangement of claim 3 wherein said one of said elements having said bore is the stator element.

5. A bearing arrangement for electric motors and the like comprising, support means having a cylindrical bore, a bearing sleeve having an outer diameter smaller than the diameter of said bore and a central bore adapted to receive a shaft, the wall of the bore in said support means and the periphery of said bearing sleeve being formed with respective aligned annular grooves of substantially equal width and depth, and means substantially nonresilient in the axial direction for engaging said aligned grooves, said engaging means comprising a corrugated spring clip of a width to be received in said grooves with a predetermined clearance and a length approximately equal to the circumferential length of said grooves, the peaks and valleys of the corrugations of said clip being retained in the annular grooves in the wall of said cylindrical bore and the bearing sleeve, respectively, thereby limiting axial movement therebetween to said predetermined clearance.